United States Patent [19]

Murao et al.

[11] Patent Number: 5,335,331
[45] Date of Patent: Aug. 2, 1994

[54] MICROCOMPUTER USING SPECIFIC INSTRUCTION BIT AND MODE SWITCH SIGNAL FOR DISTINGUISHING AND EXECUTING DIFFERENT GROUPS OF INSTRUCTIONS IN PLURAL OPERATING MODES

[75] Inventors: Yutaka Murao, Tokyo; Tetsuro Wada, Yokohama, both of Japan

[73] Assignee: Kabushiki Kaisha Toshiba, Kawasaki, Japan

[21] Appl. No.: 728,681

[22] Filed: Jul. 12, 1991

[30] Foreign Application Priority Data

Jul. 13, 1990 [JP] Japan .................... 2-185605

[51] Int. Cl.$^5$ ............................... G06F 9/46
[52] U.S. Cl. ...................... 395/375; 364/948.1; 364/941; 364/933.5; 364/948.11; 364/DIG. 2; 364/232.9; 364/263.2; 395/425
[58] Field of Search .................. 395/375, 425

[56] References Cited

U.S. PATENT DOCUMENTS

| | | | |
|---|---|---|---|
| 3,771,138 | 11/1973 | Celtruda et al. | 395/375 |
| 4,135,240 | 1/1979 | Ritchie | 395/425 |
| 4,344,129 | 8/1982 | Asada et al. | 395/775 |
| 4,451,884 | 5/1984 | Heath et al. | 395/275 |
| 4,519,032 | 5/1985 | Mendell | 395/425 |
| 4,580,240 | 4/1986 | Watanabe | 395/425 |
| 4,779,187 | 10/1988 | Letwin | 395/725 |
| 4,876,639 | 10/1989 | Mensch, Jr. | 395/500 |
| 4,930,068 | 5/1990 | Katayose et al. | 395/725 |

Primary Examiner—Thomas C. Lee
Assistant Examiner—Paul Harrity
Attorney, Agent, or Firm—Foley & Lardner

[57] ABSTRACT

To increase the kinds of executable instructions of a microcomputer without increasing the number of bits (e.g. 8 bits) constituting one word or instruction, that is, without decreasing the execution speed or increasing the ROM usage, two or more instruction groups including instructions of different kinds, respectively, are provided operation modes are determined for the respective instruction groups; and the respective instruction groups to be executed are switched according to the respective operation modes. The microcomputer includes an instruction register, an execution control unit, a mode memory flip-flop, gates, two predecoders, a programmable logic array, an arithmetic logic unit, etc. The ordinary and special instruction groups can be selected in response to an interrupt entry signal and an interrupt return signal and a specific bit of an instruction, for instance.

6 Claims, 2 Drawing Sheets

MICROCOMPUTER USING SPECIFIC INSTRUCTION BIT AND MODE SWITCH SIGNAL FOR DISTINGUISHING AND EXECUTING DIFFERENT GROUPS OF INSTRUCTIONS IN PLURAL OPERATING MODES

BACKGROUND OF THE INVENTION

The present invention relates to a microcomputer.

Recently, in accordance with a strong demand for higher performance microcomputers, an increase in the effective number of instructions executable by a microcomputer has been required.

In the case of an 8-bit microcomputer, the number of the executable instructions is 256, since each instruction is composed of 8 bits, whose contents distinguish one instruction from another, and $2^8=256$. Usually, a microcomputer has addressing modes to realize an ease-of-use in flexibly accessing different addresses. Since a certain number of bits out of total 8 bits are assigned and used for designating the addressing modes, the effective number of instructions, or the number of instruction categories, or the number of kinds of instructions executable by the 8-bit microcomputer becomes far less than 256. On the other hand, as mentioned above, as the demand for higher performance microcomputers increases a migration from 8-bit microcomputers to 16-bit, 32-bit and even 64-bit microcomputers is happening in the industry. From the standpoint of the microcomputer users, this migration should be accompanied by a certain compatibility and uniformity to realize a systematic migration.

In other words, a series of microcomputer models from 8-bit to 64-bit is required in order to base a systematic concept common throughout the series.

The above requirement can be achieved by increasing the kinds of instructions, without modifying the processing unit of the CPU; in other words, by facilitating incorporation of $\mu$OS (operating system) with the basic 8-bit microcomputer. For this purpose, a method of increasing the number of bits which constitute one word can be considered. That is, in the case of an 8-bit microcomputer, when the second byte is used to designate the kinds of instructions in addition to the first byte, it is possible to increase the number of instructions that can be executed from $2^8=256$ to $2^{16}=65536$.

In this method, although the number of instructions that can be executed can be definitely increased, there exists a problem in that the processing speed is reduced by half and therefore the execution time is doubled, because the CPU must read an instruction twice, 8 bits by 8 bits, in each instruction execution. In addition, there exists another problem in that the capacity of the ROM must be increased both with the increasing number of instructions and the increasing number of bits constituting one word.

As described above, although it has been so far considered that the kinds of instructions can be increased by simply increasing the number of bits constituting one word, this inevitably results in an increase in execution time and ROM usage.

SUMMARY OF THE INVENTION

Therefore, an object of the present invention is to provide a microcomputer which can increase the kinds of executable instructions without increasing the number of bits indicative of one instruction.

To achieve the above-mentioned object, the present invention provides a microcomputer including instruction storing means for storing at least two instruction groups. These instructions groups include instructions of different kinds, respectively- distinguishable on the basis of a specific bit of an instruction. A instruction register means is provided for storing an instruction read from the instruction storing means; execution control means for controlling the storing operation of an instruction to the instruction register means. A mode memory means stores operation mode information for plural operation modes corresponding to the at least two instruction groups, respectively, in response to mode switch signals given by the execution control means. A selecting means is provided for outputting a select signal according to the specific bit and an output of the mode memory means. An instruction decoding means is provided for decoding the instruction stored in the instruction register means.

In the microcomputer of the present invention, two or more instruction groups including instructions of different kinds, respectively are provided operation modes are determined for the respective instruction groups; and the respective instruction groups to be executed are switched according to the respective operation modes. Therefore, it is possible to increase the kinds of executable instructions without increasing the number of bits which represent one instruction. That is, since the CPU can execute an instruction by reading one byte (e.g. 8 bits) only once, the execution speed will not be reduced as compared with other methods, in spite of the fact that the kinds of instructions can be increased. In addition, the problem will not arise such that the ROM usage increases due to an increase in the number of bits constituting one word.

DESCRIPTION OF THE PREFERRED EMBODIMENTS

An embodiment of the present invention will be described hereinbelow with reference to the drawings.

Figure 1:
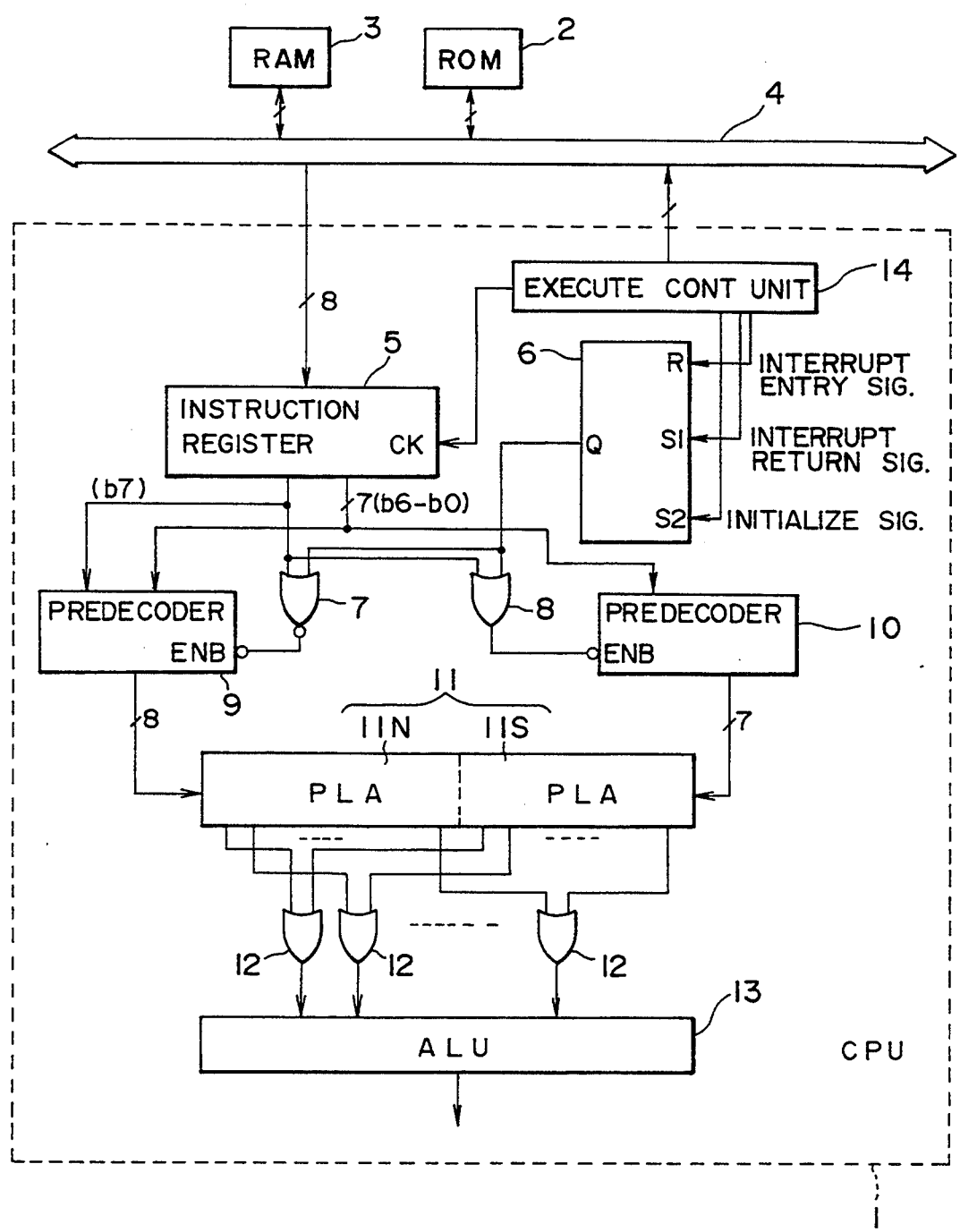
FIG. 1 is a block diagram related to one embodiment of the present invention.

FIG. 1 shows an 8-bit microcomputer related to one embodiment of the present invention.

In the drawing, a CPU 1, a ROM 2 and a RAM 3 are connected to a data bus 4. The CPU 1 reads instructions one by one from the ROM 2 or the RAM 3 via the data bus 4 to execute the read-out of instructions. As instruction there are two instructed execution modes, one of which is the ordinary mode and the other is the special mode. In the ordinary mode, user's application programs for instance, are executed. In the special mode, an OS section of the $\mu$OS can be operated, for instance.

Figure 2:
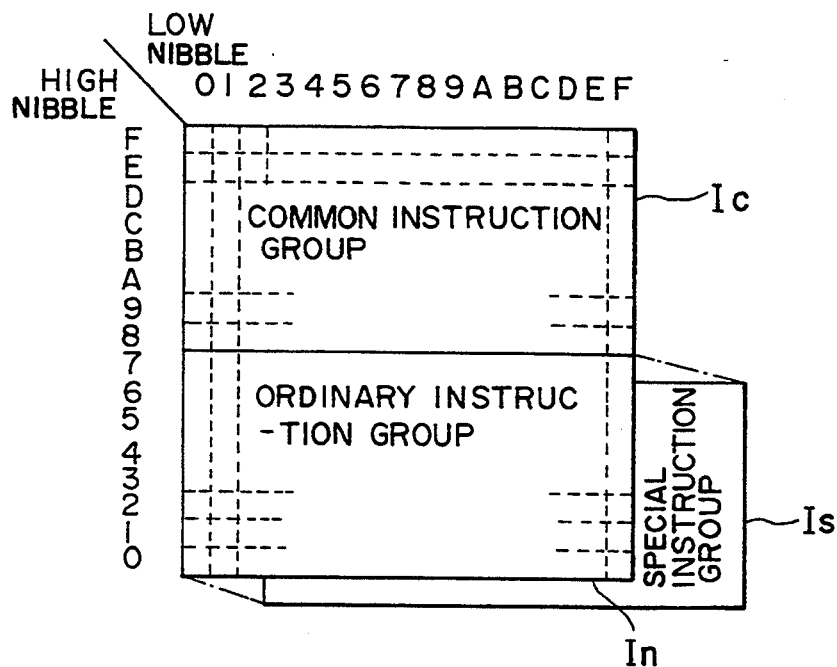
FIG. 2 shows instruction maps.

A number of instruction groups are stored in the ROM 2 so as to construct programs. As shown by the instruction map in FIG. 2, the instruction groups are stored in the ROM 2. These instruction groups are classified into the ordinary instruction group, In, usable only in the ordinary mode, the special instruction group, Is, usable only in the special mode, and the common instruction group, Ic, usable in both modes.

Figure 3:
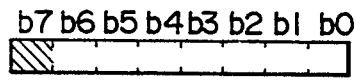
FIG. 3 is an illustration for assistance in explaining one instruction word.

As shown in FIG. 3, the most significant bit (MSB) b7 of 8 bits (b0 to b7) which constitute one instruction is used as a bit for discriminating the kinds of instructions of the common, ordinary and specific groups. That is, if b7 is "1", it indicates the common and ordinary instructions; if b7 is "0", it indicates the common and special instructions.

The CPU 1 includes an instruction register 5 a mode memory flip-flop (referred to as FF, hereinafter) 6, and switching gates 7 and 8 for generating switch control signals in response to signals from the register 5 and the FF 6. Predecoders 9 and 10 are activated by output signals of these switching gates 7 and 8, respectively PLA (Programmable Logic Array) 11, output gates 12, 12, ... ; an ALU (Arithmetic and Logic Unit) 13; an execution control unit 14; an instruction read control system (not shown); an instruction write control system (not shown), etc. are also included in CPU 1.

The CPU 1 reads one instruction by designating an address in the ROM 2 through the instruction read control system. The read instruction is held by the instruction register 5.

The mode memory FF 6 outputs an "H" (high level) signal from an output terminal Q when set and an "L" (low level) signal therefrom when reset. This mode memory FF 6 is set in response to either an initialize signal or an interrupt return signal, and reset in response to an interrupt entry signal.

When an interrupt request is accepted and the program execution enters into interrupt service, the interrupt entry signal is generated by the execute control unit 14, which resets the mode memory FF 6 and thus changes the operation mode from the ordinary mode to the special mode.

At the end of the interrupt service program, when the return-from-interrupt instruction is executed, the interrupt return signal is generated by the execute control unit 14 which sets the mode memory FF 6 and thus changes the operation mode from the special mode to the ordinary mode.

Therefore, the mode memory FF 6 holds the status as the special mode from the interrupt entry until the interrupt return, and otherwise holds the status as the ordinary mode.

The switching gate 7 is a NOR gate, which outputs an "L" output whenever at least one of the levels of the bit b7 of an instruction given by the instruction register 5 and the output Q of the mode memory FF 6 is at "H", and an "H" output whenever both of them are at "L".

The switching gate 8 is an OR gate, which outputs an "L" output whenever the levels of the bit b7 of an instruction given by the register 5 and the output Q of the mode memory FF 6 are both at "L", and an "H" output whenever at least one of them is at "H".

The predecoders 9 and 10 execute "grouping" of instructions given by the instruction register 5. That is, the predecoder 9 is activated in response to an "L" output from the NOR gate 7 to execute instructions of the common instruction group Ic and the ordinary instruction group In. On the other hand, the predecoder 10 is activated in response to an "L" output from the OR gate 8 to execute the specific instruction group Is.

The function of the PLA 11 is to issue the final control signals to ALU 13 via the gates 12, in order to make ALU 13 perform the appropriate operation, such as add, subtract, etc., dictated and necessitated by the instruction currently being executed. This PLA 11 includes two logic circuit block 11N and 11S. An output of the predecoder 9 is inputted to the logic circuit block 11N, and an output of the predecoder 10 is inputted to the logic circuit block 11S.

The execution control unit 14 reads instructions stored in the ROM 2 out to the instruction register 5, and further outputs the interrupt entry signal, the interrupt return signal and the initialize signal.

The operation of the microcomputer will be described hereinbelow.

Right after the initialization, since the mode memory FF 6 is initialized by the execution control unit 14, the mode is set to the ordinary mode. In the ordinary mode, since the output of the mode memory FF 6 is at "H", the output of the NOR gate 7 is kept at "L" to activate the predecoder 9, irrespective of the level of the bit b7. Further, the output of the OR gate 8 is kept at "H" to deactivate the predecoder 10, irrespective of the level of the bit b7. Therefore, since only the output of the predecoder 9 is actively given to the PLA 11, the output of this PLA 11 is determined by only the output of the predecoder 9, so that the common instruction group Ic and the ordinary instruction group In are to be executed.

Under these conditions, if an interrupt entry signal is generated by the execution control unit 14 to reset the mode memory FF 6, the mode memory FF 6 outputs an "L" level signal, so that the outputs of the two gates 7 and 8 are determined in accordance with the level of the instruction bit b7.

That is, if the bit b7 is at an "L" level which indicates the special instruction, the output of the NOR gate 7 changes to "H" to deactivate the predecoder 9, and the output of the OR gate 8 changes to "L" to activate the predecoder 10. Therefore, the output of the PLA 11 is determined by only the output of the predecoder 10.

Further, if the bit b7 is at "H" level which indicates the common instruction, the output of the NOR gate 7 changes to "L" to activate the predecoder 9, and the output of the OR gate changes to "H" to deactivate the predecoder 10. Therefore, the output of the PLA 11 is determined by only the output of the predecoder 9.

Accordingly, when the mode memory FF 6 is reset to the special mode in response to the interrupt entry signal, instructions of the common instruction groups Ic and the special instruction groups Is can be executed. Further, when the interrupt return signal is generated by the execution control unit 14, since the mode memory FF 6 is set, so that the output thereof changes to "H" to return the mode to the ordinary mode.

As described above, it is possible to increase the kinds of instructions in accordance with the instruction execution mode and the specific instruction bit. In the case of the example shown in FIG. 2, 128 common instructions, 128 ordinary instructions and 128 special instructions (i.e. 384 instructions in total) can be executed.

Since the CPU can execute instructions on the basis of a single instruction reading operation, it is possible to avoid reduced execution speed as compared with the conventional method, in spite of the fact that the number of kinds of instructions are increased. Further, there will not arise such a problem that the ROM usage increases due to an increase in the number of bits constituting one word.

Figure 4:
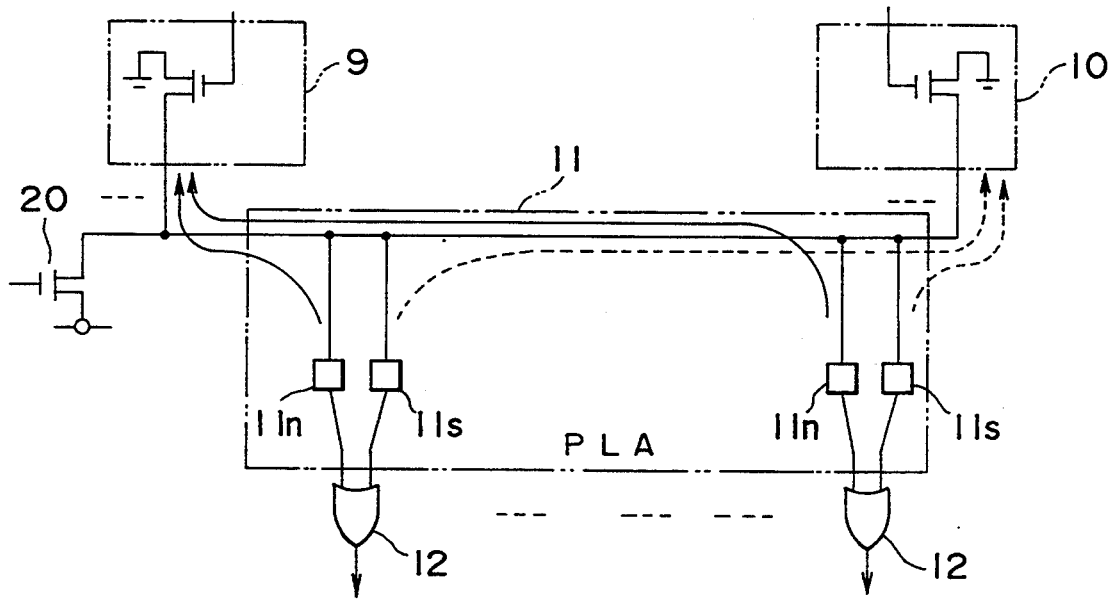
FIG. 4 is a circuit diagram showing internal circuits of predecoders and a PLA.

FIG. 4 shows an example of the internal configuration of the predecoders 9 and 10 and the PLA 11, in which the outputs of the predecoders 9 and 10 are of open drain type mutually connected in wired-OR manner and only a single bit route is shown for simplification.

Blocks 11n, 11n, ... denote terms constituting those corresponding to the logic circuit block 11N shown in FIG. 1, and blocks 11s, 11s, ... denote terms constituting those corresponding to the logic circuit block 11S also shown in FIG. 1.

In the above configuration, if the predecoder 9 is enabled, the output of terms 11n, 11n, ... determined by the output of the predecoder 9 is outputted through an OR gate 12, and if the predecoder 10 is enabled, the output of terms 11s, 11s, ... determined by the output of the predecoder 10 is outputted through the OR gate 12. Further, a precharge circuit 20 is provided, because the open drains connected in wired-OR manner must be precharged, as is well known.

As described, in the present embodiment, since the outputs of two predecoders 9 and 10 are formed into open drain type and connected in wired-OR manner, it is possible to arrange side by side the terms 11n and 11s outputted to the same bit output line of the PLA 11. Therefore, the wiring work can be eased, with the result that the configuration shown in FIG. 4 is more advantageous from the standpoint of chip layout than the case where the logic circuits 11N and 11S are arranged remote from each other as shown in FIG. 1.

In the above embodiments, the operation modes are switched on the basis of the interrupt entry signal and the interrupt return signal. Without being limited thereto, however, it is possible to switch the modes on the basis of a subroutine call signal and a subroutine return signal, for instance.

What is claimed is:

1. A microcomputer comprising:
   instruction storing means for storing at least two instruction groups including instructions of different kinds, respectively distinguished on the basis of a specific bit of an instruction;
   instruction register means for storing an instruction read from said instruction storing means;
   execution control means for controlling the storing operation of said instruction to said instruction register means, said execution control means outputting a mode switch signal;
   mode memory means for storing operation mode information for plural operation modes corresponding to the at least two instruction groups, in response to mode switch signals given by said execution control means;
   a predecoder receiving the specific bit from the instruction register means and the operation mode information from the mode memory means for processing said instruction as one of a first instruction in a first operation mode of said plural operation modes when the specific bit is a first value and the operation mode information indicates said first operation mode, a second instruction in a second operation mode of said plural operation modes when the specific bit is a first value and the operation mode information indicates said second operation mode, a third instruction in said first operation mode when the specific bit is a second value and the operation mode information indicates said first operation mode, and a fourth instruction when the specific bit is a second value and the operation mode information indicates said second operation mode, said predecoder outputting predecoded data; and
   instruction decoding means comprising a programmable logic array for decoding the predecoded data from said predecoder, said programmable logic array having a part selected by said specific bit and said operation mode information and outputting a decoded result; and
   arithmetic logic means, coupled to said programmable logic array, for performing an arithmetic operation on the decoded result from said programmable logic array.

2. The microcomputer of claim 1, wherein the mode switch signals are an interrupt entry signal and an interrupt return signal.

3. The microcomputer of claim 1, wherein the mode switch signals are a subroutine call signal and a subroutine return signal.

4. The microcomputer of claim 1, wherein the number of instruction groups are two, and a part of the instruction group includes a common instruction group composed of instructions common for both the instruction groups.

5. A microcomputer comprising:
   instruction storing means for storing a common instruction group, a first operation mode instruction group, and a second operation mode instruction group, said groups including instructions of different kinds whose application operation modes are distinguished on the basis of a specific bit of an instruction and a mode switch signal;
   instruction register means for storing an instruction read from said instruction storing means;
   execution control means for controlling said storing operation of said instruction into said instruction register means, said execution control means outputting said mode switch signal;
   mode memory means for storing operation mode information indicative of one of a first and second operation mode of said application operation modes corresponding to a respective one of said first and second operation mode instruction groups in response to said mode switch signal given by said execution control means;
   first execution enable signal generating means for receiving the specific bit of the instruction from the instruction register means and the operation mode information from the mode memory means to generate a first execution enable signal when the operation mode information in said mode memory means indicates the first operation mode and when the specific bit of the instruction in said instruction register means is at a first value;
   second execution enable signal generating means for receiving the specific bit of the instruction from the instruction register means and the operation mode information from the mode memory means to generate a second execution enable signal when the operation mode information in said mode memory means indicates the second operation mode and when the specific bit of the instruction in said instruction register means is at a second value;
   first predecoder means for processing said instruction included in a first instruction group composed of the common instruction group, common to both said first and second operation modes and obtained when the specific bit of the instruction is at the first value, and the first operation mode instruction group obtained when the specific bit of the instruction is at the second value, said first predecoder means being operative in response to said first execution enable signal, said first predecoder means outputting first predecoded data;

second predecoder means for processing said instruction included in a second instruction group composed of only the second operation mode instruction group obtained when the specific bit is at the second value, said second predecoder means being operative in response to said second execution enable signal, said second predecoder means outputting second predecoded data;

programmable logic array means including a first unit for decoding said first predecoded data output from said first predecoder means and outputting a decoded result and a second unit for decoding said second predecoded data output from said second predecoder means and outputting a decoded result; and arithmetic logic means, coupled to said programmable logic array means, for performing an arithmetic operation on the decoded result from said programmable logic array means.

6. The microcomputer of claim 5, wherein said first and second predecoder means have open type output terminals of wired-OR connection.

* * * * *